United States Patent [19]

Bullen et al.

[11] 4,374,545
[45] Feb. 22, 1983

[54] CARBON DIOXIDE FRACTURING PROCESS AND APPARATUS

[75] Inventors: Ronald S. Bullen; Allan T. Lillies, both of Calgary, Canada

[73] Assignee: L.H.B. Investment, Inc., Oklahoma City, Okla.

[21] Appl. No.: 337,743

[22] Filed: Jan. 7, 1982

[30] Foreign Application Priority Data

Sep. 28, 1981 [CA] Canada ................... 386809

[51] Int. Cl.³ .......................................... E21B 43/267
[52] U.S. Cl. .................... 166/280; 166/177; 166/308; 166/302
[58] Field of Search ............... 166/271, 280, 305 R, 166/302, 308, 177

[56] References Cited

U.S. PATENT DOCUMENTS

| | | | |
|---|---|---|---|
| 3,090,439 | 5/1963 | Copland et al. | 166/177 X |
| 3,108,836 | 10/1963 | Peterson | 166/308 |
| 3,193,014 | 7/1965 | Hill | 166/177 X |
| 3,310,112 | 3/1967 | Nielson | 166/280 |
| 3,368,627 | 2/1968 | Hurst et al. | |
| 3,384,176 | 5/1968 | Huitt | |
| 3,396,107 | 8/1968 | Hill | |
| 3,664,422 | 5/1972 | Bullen | 166/308 X |
| 3,765,488 | 10/1973 | Pence, Jr. | 166/308 |
| 3,822,747 | 7/1974 | Maguire | 166/308 X |
| 3,842,910 | 10/1974 | Zingg et al. | 166/305 R |
| 4,186,802 | 2/1980 | Perlman | 166/280 |
| 4,212,354 | 7/1980 | Guinn | 166/308 X |

FOREIGN PATENT DOCUMENTS

| | | |
|---|---|---|
| 659729 | 3/1963 | Canada . |
| 687938 | 6/1964 | Canada . |
| 745453 | 11/1966 | Canada . |
| 796558 | 10/1968 | Canada . |
| 808434 | 3/1969 | Canada . |
| 840206 | 4/1970 | Canada . |
| 932655 | 8/1973 | Canada . |
| 997675 | 9/1976 | Canada . |
| 1004141 | 1/1977 | Canada . |
| 1000483 | 7/1978 | Canada . |
| 1034363 | 7/1978 | Canada . |
| 1043091 | 11/1978 | Canada . |

Primary Examiner—Stephen J. Novosad
Assistant Examiner—George A. Suchfield
Attorney, Agent, or Firm—Lerner, David, Littenberg & Samuel

[57] ABSTRACT

There is described a new and improved method of fracturing an underground stratigraphic formation penetrated by a well bore including the steps of pumping a stream of liquified gas into the formation to cause the fracturing thereof and then introducing proppants directly into the stream of liquified gas for injection of the proppants into the fractures. Prior to introducing the proppants into the liquid gas stream, they are cooled and pressurized to the storage temperature and pressure of the liquified gas.

23 Claims, 7 Drawing Figures

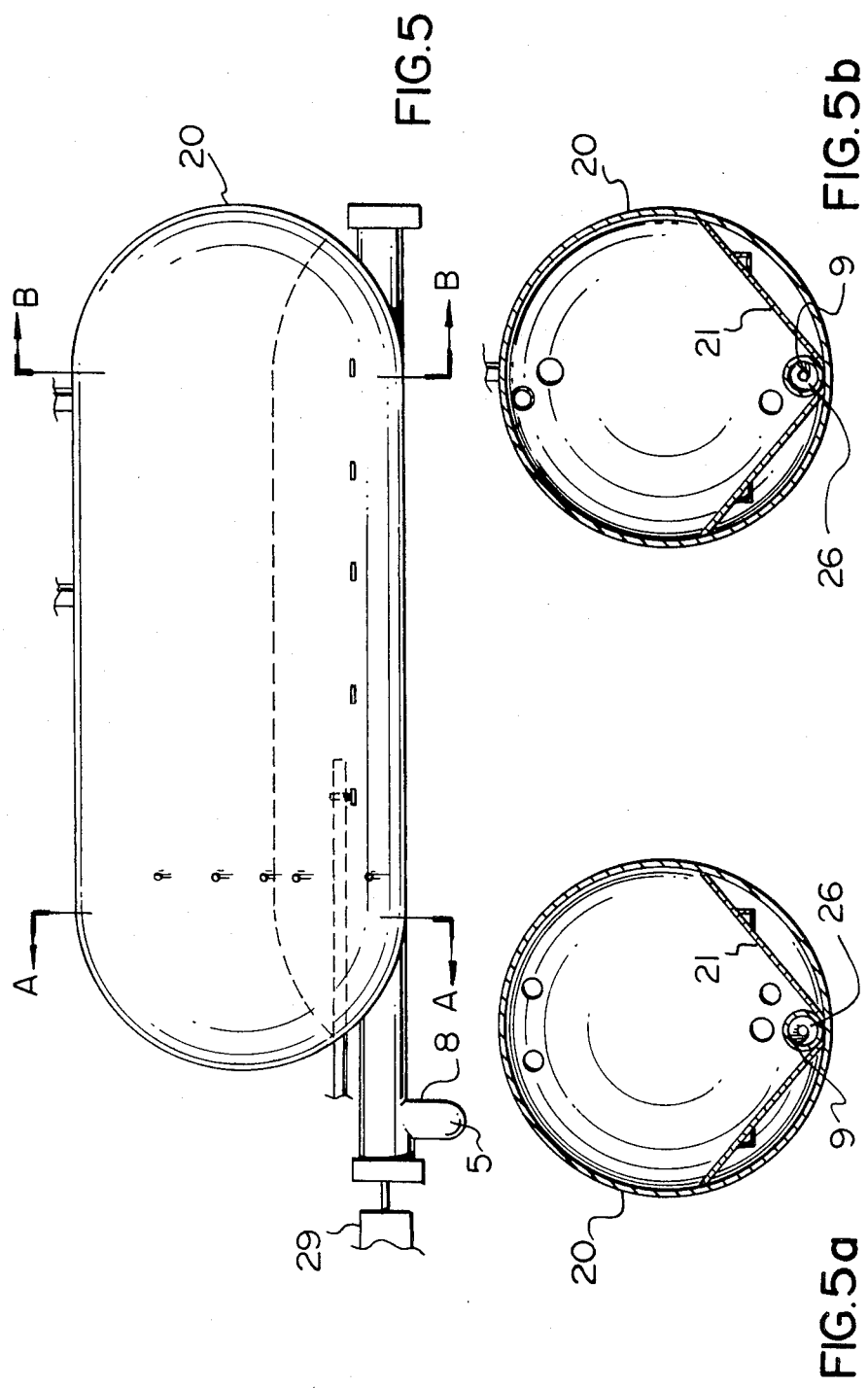

CARBON DIOXIDE FRACTURING PROCESS AND APPARATUS

BACKGROUND OF THE INVENTION

This invention relates to the art of hydraulically fracturing subterranean earth formations surrounding oil wells, gas wells and similar bore holes. In particular, this invention relates to hydraulic fracturing utilizing a liquified carbon dioxide gas containing entrained propping agents.

Hydraulic fracturing has been widely used for stimulating the producion of crude oil and natural gas from wells completed in reservoirs of low permeability. Methods employed normally require the injection of a fracturing fluid containing suspended propping agents into a well at a rate sufficient to open a fracture in the exposed formation. Continued pumping of fluid into the well at a high rate extends the fracture and leads to the build up of a bed of propping agent particles between the fracture walls. These particles prevent complete closure of the fracture as the fluid subsequently leaks off into the adjacent formations and results in a permeable channel extending from the well bore into the formations. The conductivity of this channel depends upon the fracture dimensions, the size of the propping agent particles, the particle spacing and the confining pressures.

The fluids used in hydraulic fracturing operations must have fluid loss values sufficiently low to permit build up and maintenance of the required pressures at reasonable injection rates. This normally requires that such fluids either have adequate viscosities or other fluid loss control properties which will reduce leak-off from the fracture into the pores of the formation.

Fracturing of low permeability reservoirs has always presented the problem of fluid compatability with the formation core and formation fluids, particularly in gas wells. For example, many formations contain clays which swell when contacted by aqueous fluids causing restricted permeability, and it is not uncommon to see reduced flow through gas well cores tested with various oils.

Another problem encountered in fracturing operations is the difficulty of total recovery of the fracturing fluid. Fluids left in the reservoir rock as immobile residual fluids impede the flow of reservoir gas or fluids to the extent that the benefit of fracturing is decreased or eliminated. The removal of the fracturing fluid may require the expenditure of a large amount of energy and time, consequently the reduction or elimination of the problem of fluid recovery and residue removal is highly desirable.

In attempting to overcome the fluid loss problems, gelled fluids prepared with water, diesel, methyl alcohol and similar low viscosity liquids have been useful. Such fluids have apparent viscosities high enough to support the propping agent particles without settling and also high enough to prevent excessive leak-off during injection. The gelling agents also promote laminar flow under conditions where turbulent flow would otherwise take place and hence in some cases, the pressure losses due to fluid friction may be lower than those obtained with low viscosity-base fluids containing no additives. Certain water-soluble poly-acrylamides, oil soluble poly-isobutylene and other polymers which have little effect on viscosity when used in low concentration can be added to the ungelled fluid to achieve good friction reduction.

In attempting to overcome the problem of fluid compatability when aqueous fracturing fluids are used, chemical additives have been used such as salt or chemicals for pH control. Salts such as NaCl, KCl or $CaCl_2$ have been widely used in aqueous systems to reduce potential damage when fracturing water sensitive formations. Where hydrocarbons are used, light products such as gelled condensate have seen a wide degree of success, but are restricted in use due to the inherent hazards of pumping volatile fluids.

Low density gases such as $CO_2$ or $N_2$ have been used in attempting to overcome the problem of removing the fracturing liquid. The low density gases are added at a calculated ratio which promotes fluid flow subsequent to fracturing. This back flow of load fluids is usually due to reservoir pressure alone without mechanical aid from the surface because of the reduction of hydrostatic head caused by gasifying the fluid.

Moreover, low density liquified gases have themselves been used as fracturing fluids. Reference is made to Canadian Pat. Nos. 687,938 and 745,453 to Peterson who discloses a method and apparatus for fracturing underground earth formations using liquid $CO_2$. Peterson recognized the advantages of liquid $CO_2$ as a means to avoid the usually time consuming and expensive procedures involved in the recovery of more conventional fracturing fluids. Petersen does not, however, disclose the use of entrained proppants in conjunction with liquid $CO_2$. The combination of a liquid $CO_2$ fracturing fluid and propping agents has been described by Bullen in Canadian Pat. No. 932,655 wherein there is described a method of entraining proppants in a gelled fluid, typically a gelled methanol, which is mixed with liquid carbon dioxide and injected into low permeability formations. The liquid carbon dioxide is allowed to volatize and bleed off and the residual liquid, primarily methyl alcohol, is in part dissolved by formation hydrocarbons and allowed to return to the surface as vapor, the balance, however, being recovered as a liquid using known recovery techniques. Clearly, it has been demonstrated that the need to use a gelled carrier fluid has resulted in the negation of some of the fluid recovery advantages attendant upon the use of liquified gas fracturing fluids.

Subsequent disclosures have been primarily concerned with the development of more advantageous gelled fluids to entrain proppants for subsequent or simultaneous blending with the liquified carbon dioxide fracturing fluid. Reference is made to Canadian Pat. Nos. 1,000,483 (reissued as Canadian Pat. No. 1,034,363) and 1,043,091 in this regard. Each of these patents teaches the nature and composition of gelled carrier fluids, typically methanol based, which, when blended with liquid $CO_2$, produce an allegedly anhydrous liquid system which allegedly is useful in attempting to overcome the problems of fluid compatability with formation fluids.

SUMMARY OF THE INVENTION

From the foregoing, it will be readily appreciated that the use of liquid $CO_2$ as a fracturing agent is known. It is further known to use other liquids having propping agents entrained therein for blending with the liquified gas fracturing fluid. The propping agents are subsequently deposited in the liquid-formed fractures for the purpose of maintaining flow passages upon rebound of the fracture zone. It is further known that proppant materials can be introduced into a liquid carbon dioxide system if a gelled liquid, usually methanol, is mixed with the $CO_2$ to impart sufficient viscosity to the mixture to support proppant particles. Typically, such mixtures include 40% to 70% by volume gelled methanol or its equivalent with the result that large residual liquid fractions must be recovered from the fracture zones.

It has gone unrecognized, however, that proppant materials can be introduced directly into a liquid carbon dioxide stream using no or as little as 5% by volume gelled carrier fluid. In fact, the prior art specifically teaches away from the direct introduction of proppant materials into the liquid carbon dioxide stream.

As mentioned previously, known gelled carrier fluids are almost invariably alcohol based and are therefore extremely flammable so that handling and pumping thereof poses very substantial fire hazards. Moreover, it is the industry practice to add proppants to these fluids at atmospheric pressures thereby increasing the fire hazards by allowing potentially explosive vapors to escape into the surrounding atmosphere.

It is therefore an object of the present invention to provide a method of hydraulic fracturing utilizing liquid carbon dioxide and propping agents which obviates and mitigates from the aforementioned hazards and disadvantages of prior art methods.

It is a further object of the present invention to provide a method of fracturing underground stratographic formations penetrated by a well bore wherein a stream of liquefied gas is pumped into the formation to cause the fracturing thereof and proppant particles are introduced into the stream of liquefied gas for injection of the proppants into the fractures so formed.

It is a further object of the present invention to provide an improved method for propping open an hydraulically fractured underground stratographic formation penetrated by a well bore wherein propping agents are introduced into a stream of pressurized liquefied gas, the propping agents themselves being pressurized and cooled to the pressure and temperature of the liquefied gas prior to their introduction and pumping the mixture of liquefied gas and entrained proppants down the well bore into the formation to deposit the proppants in the fractures formed in the formation.

It is yet another object of the present invention to provide an improved apparatus for hydraulically fracturing underground stratographic formations penetrated by a well bore including a high pressure pump for injecting a fracturing fluid down the well bore, the fluid being a liquefied gas, means to store the liquefied gas under pressure, means to provide fluid communication between the pump and the storage means, additional storage means to store proppants at a temperature and pressure substantially equal to the pressure and temperature of the liquefied gas and means to introduce the proppants into the liquefied gas stream.

According to the present invention, then, there is provided a method for fracturing an underground stratigraphic formation penetrated by a well bore comprising the steps of pumping a stream of liquified gas into the formation to cause the fracturing thereof, and introducing proppants into the stream of liquified gas for injection of the proppants into the fractures.

According to a further aspect of the present invention, there is described a method of propping open an hydraulically fractured underground stratigraphic formation penetrated by a well bore comprising the steps of introducing propping agents into a stream of pressurized liquified gas, the propping agents themselves being pressurized and cooled to the pressure and temperature of the liquified gas, respectively, prior to the introduction, and pumping the mixture of the liquified gas and entrained propping agents down the well bore into the formation to deposit the proppants in the fractures formed in the formation.

According to a further aspect of the present invention, there is provided apparatus for hydraulically fracturing an underground stratigraphic formation penetrated by a well bore comprising a high pressure pump for injecting a fracturing fluid down the well bore, the fluid comprising a liquified gas, first storage means to store the liquified gas under pressure, conduit means to provide fluid communication between the pump and the first storage means, second storage means to store proppants at a temperature and pressure substantially equal to the storage pressure and temperature of the liquified gas, and supply means to introduce the proppants from the second storage means into the liquified gas flowing through the conduit means.

In a preferred embodiment, the present invention provides a method of well stimulation with no reservoir contamination by residual liquid and complete recovery of the load fluid. Liquified carbon dioxide containing entrained propping agents is injected into the formation. The liquid carbon dioxide gas is injected until fracture of sufficient width to produce a highly conductive channel has been formed. Particles of the propping agent, suspended in the carbon dioxide, are carried into the fracture. The injected fluid is then permitted to bleed off into the formation until the fracture has closed sufficiently to hold the particles in place. The liquid carbon dioxide eventually gasifies due to formation heat and is recovered at the surface, leaving no residual liquid to recover.

According to a further aspect of an embodiment of the invention, propping agents are pressurized to the handling pressure of a liquefied gas fracturing fluid, cooled to the handling temperature of the liquefied gas, and the proppant is subsequently added to the stream of liquefied gas and injected into the formations surrounding the well bore.

According to a further preferred embodiment of the present invention, up to 20% by volume of gelled methanol may be added to the liquid $CO_2$ proppant stream to increase the viscosity of the liquefied $CO_2$.

BRIEF DESCRIPTION OF THE DRAWINGS

Embodiments of the invention will now be described in greater detail and will be better understood when read in conjunction with the following drawings in which:

FIGS. 5, 5a and 5b are more detailed views of the tank of FIGS. 3 and 4.

DESCRIPTION OF THE PREFERRED EMBODIMENT

It will be appeciated by those skilled in the art that a number of different liquefied gases having suitable viscosities and critical temperatures may be utilized as fracturing fluids. For purposes of illustration, however, and having regard to the cost and safety advantages afforded by the use of carbon dioxide, reference will be made herein to the use of liquefied carbon dioxide as the principal fracturing agent of the present hydraulic fracturing method.

Figure 1:
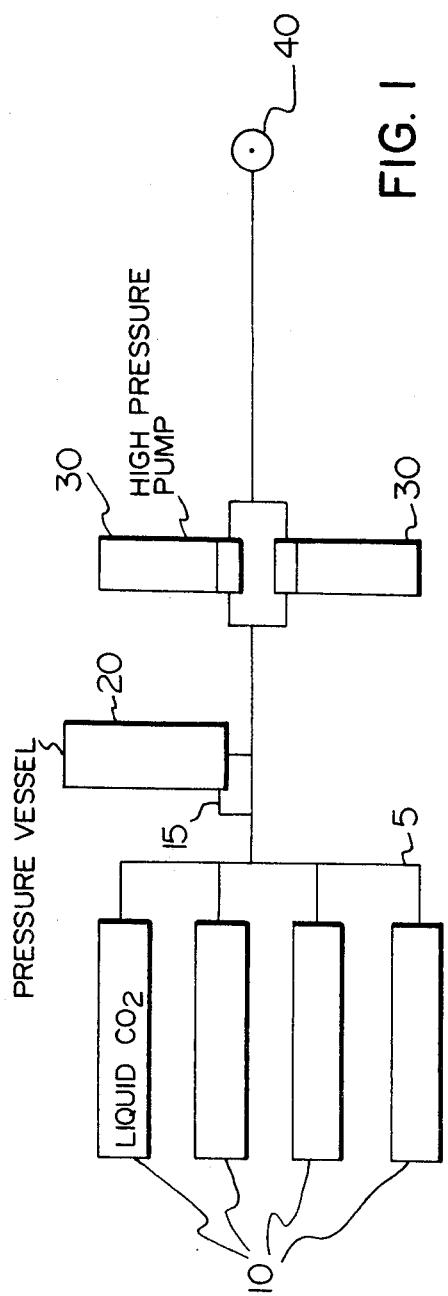
FIG. 1 is a block diagram of the hydraulic fracturing system as more fully described below.
Figure 2:
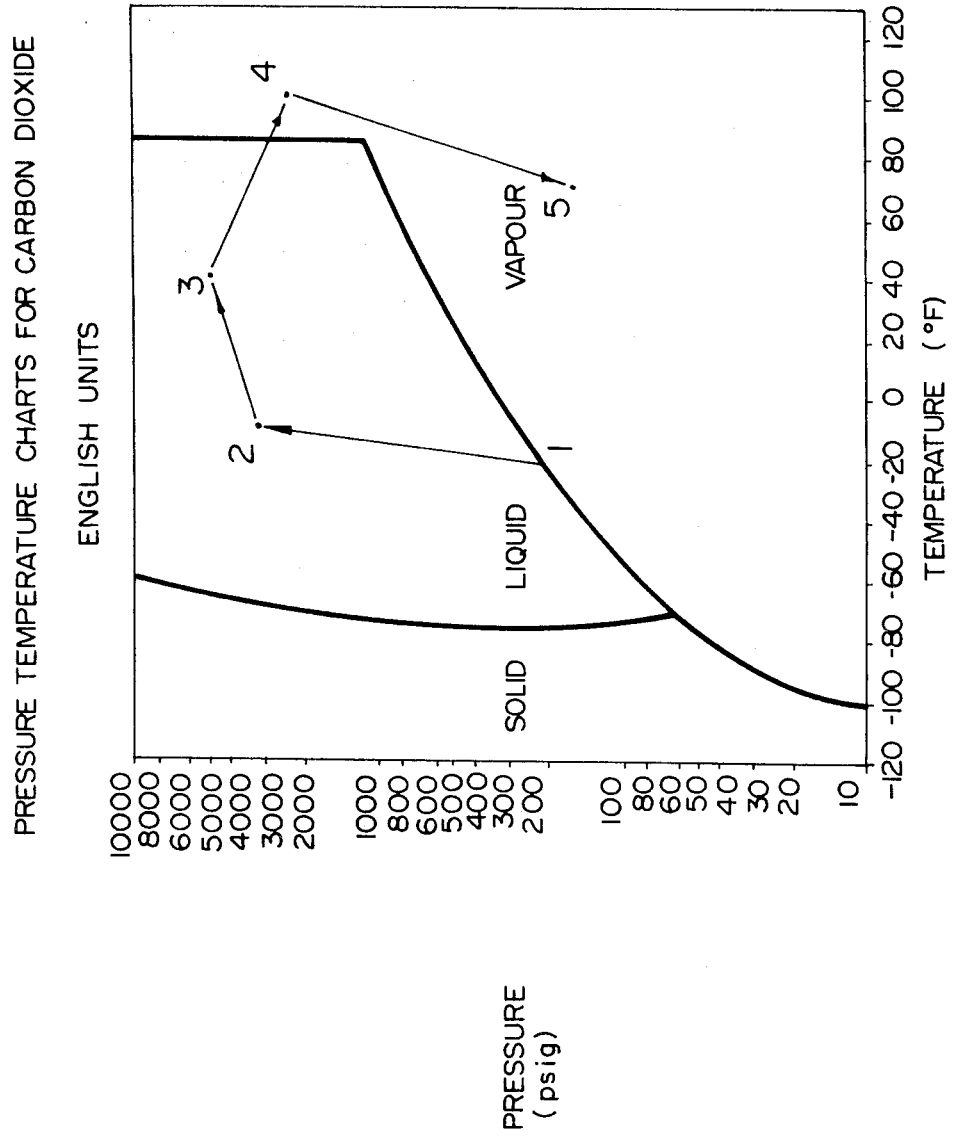
FIG. 2 is a pressure-temperature plot for $CO_2$ in the region of interest with respect to the method of well fracturing described hereinafter.

Referring now to FIGS. 1 and 2 together, liquified $CO_2$ and proppants are transported to a well site. At the site, the liquified $CO_2$ is initially maintained at an equilibrium temperature and pressure of approximately $-25°$ F. and at 200 psi (#1 in FIG. 2) in a suitable storage vessel or vessels 10 which may include the transport vehicle(s) used to deliver the liquified gas to the site. The proppants are also stored in a pressure vessel 20. The proppants are pressurized and cooled using some liquid $CO_2$ from vessels 10 introduced into vessel 20 via manifold or conduit 5 and tank pressure line 15. In this manner, the proppants are cooled to a temperature of approximately $-25°$ F. and subjected to a pressure of approximately 200 psi.

Liquid $CO_2$ vaporized by the proppant cooling process is vented off and a ½ to ¾ capacity (FIG. 3) level 24 of liquid $CO_2$ is constantly maintained in vessel 20 so as to prevent the passage of vapor downstream to the high pressure pumps 30 used to inject the fracture fluids into the well bore 40. Pumps 30 are of conventional or known design so that further details thereof have been omitted from the present description.

Prior to the commencement of the fracturing process, the liquid $CO_2$ stored in vessels 10 is pressured up to approximately 300 to 350 psi, that is, about 100 to 150 psi above equilibrium pressure, so that any pressure drops or temperature increases in the manifolds or conduits between vessels 10 and pumps 30 will not result in the release of vapour but will be compensated for to ensure delivery of $CO_2$ liquid to frac pumps 30. Methods of pressuring up the liquid $CO_2$ are well known and need not be described further here.

Liquified $CO_2$ is delivered to pumps 30 from vessels 10 along a suitable manifold or conduit 5. Pumps 30 pressurize the liquified $CO_2$ to approximately 3,500 to 5000 psig (#2), the well-head injection pressure. The temperature of the liquid $CO_2$ increases slightly as a result of this pressurization.

The horizon to be fractured is isolated and the well casing adjacent the target horizon is perforated in any known fashion. The liquid $CO_2$ is pumped down the well bore 40, through the perforations formed into the casing and into the formation. With reference to FIG. 2, the temperature of the $CO_2$ increases as it travels down the well bore due to the absorption of heat from surrounding formations. It will therefore be appreciated that the $CO_2$ must be pumped at a sufficient rate to avoid prolonged exposure of the $CO_2$ in the well bore to formation heat sufficient to elevate the temperature of the $CO_2$ beyond its critical temperature of approximately $88°$ F.

Methods of calculating rates of heat adsorption and appropriate flow rates are well known and therefore will not be elaborated upon here. It will in any event be appreciated that with continued injection, the temperature of surrounding pipes and formations are reduced to thereby minimize vapor losses during injection.

Pressurization of the $CO_2$ reaches a peak (3) at the casing perforations and declines gradually as the $CO_2$ moves laterally into the surrounding formations. Fracturing is accomplished of course by the high pressure injection of liquified $CO_2$ into the formations. After pumping is terminated the pressure of the carbon dioxide bleeds off to the initial pressure of the formation and its temperature rises to the approximate initial temperature of the formation.

During the fracturing process, of course, the liquified carbon dioxide continues to absorb heat until its critical temperature ($87.8°$ F.) is reached whereupon the carbon dioxide volatilizes. Volatilization is accompanied by a rapid increase in $CO_2$ volume which may result in increased fracturing activity.

The gaseous $CO_2$ subsequently leaks off or is absorbed into surrounding formations. When the well is subsequently opened on flow back, the carbon dioxide exhausts itself uphole due to the resulting negative pressure gradient between the formation and the well bore.

As mentioned above, the propping agents are cooled to the approximate temperature of the liquified $CO_2$ prior to introduction of the proppants into the $CO_2$ stream. The heat absorbed from the proppants would otherwise vaporize a percentage of the liquid $CO_2$, eliminating its ability to adequately support the proppants at typical pumping rates and which could create efficiency problems in the high pressure pumpers. The specific heat of silica sand proppant is approximately 0.2 BTU/lb/°F. The heat of vaporization of $CO_2$ and 250 psig is approximately 100 BTU/lb. To cool silica sand proppant from a $70°$ F. transport temperature to the liquid $CO_2$ temperatures of $-25°$ F. will therefore require the vaporization of approximately 0.2 lb of $CO_2$ for each 1 lb of sand so cooled.

Figure 3:
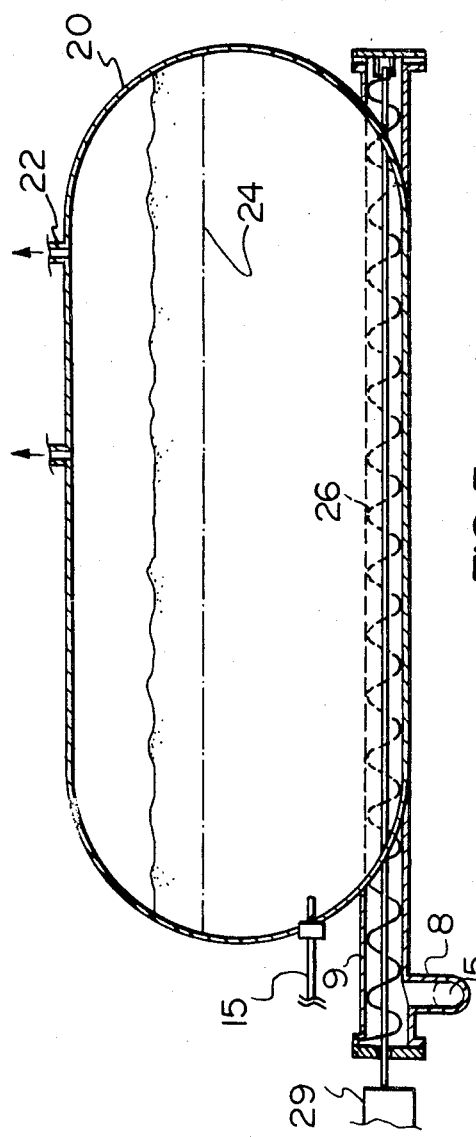
FIG. 3 is a sectional view taken along the longitudinal axis of the proppant tank illustrated schematically in FIG. 1.
Figure 4:
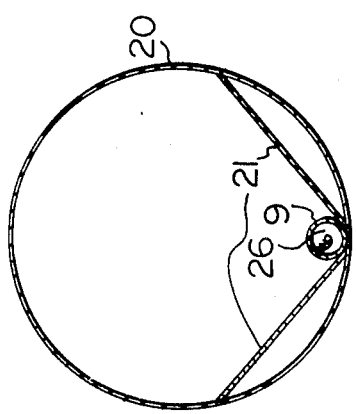
FIG. 4 is a partially sectional view of the proppant tank of FIG. 3.

Reference is now made to FIGS. 3 and 4 which illustrates proppant tank 20 in greater detail. The liquid carbon dioxide used to pressurize and cool the enclosed proppants is introduced into tank 20 via pressure line 15 and the excess vapors generated by the cooling process are allowed to escape through vent 22. Liquid $CO_2$ operating level 24 prevents an excess accumulation of vapors and further isolates the vapors from the proppants transported along the bottom of tank 20 towards the liquid $CO_2$ stream passing through conduit 5.

Tank 20 may be fitted with baffle plates 21 to direct the proppants toward a helically wound auger 26 passing along the bottom of tank 20 in a direction towards conduit 5 via an auger tube 9. Auger drive means 29 of any suitable type are utilized to rotate auger 26. Auger tube 9 opens downwardly into a chute 8 communicating with conduit 5 so that proppants entrained along the auger are introduced into the $CO_2$ stream passing through the conduit. It will be appreciated that the pressure maintained in tube 9 equals or exceeds that in conduit 5 to prevent any blow back of the liquid $CO_2$.

It will be appreciated that tank 20 may be of any suitable shape and feed mechanisms other than the one illustrated utilizing auger 26 may be employed, a number of which, including gravity feed mechanisms, will occur to those skilled in the art.

After sufficient liquified carbon dioxide has been injected into the well to create a fracture in the target formation, cooled proppants from pressurized proppant tank 20 may be introduced into the streams of liquid carbon dioxide to be carried into the fracture by the carbon dioxide. The proppants may include silica sand of 40/60, 20/40 and 10/20 mesh size. Other sizes and the use of other materials is contemplated depending upon the requirements of the job at hand.

It will be appreciated that if so desired, cooled proppants may be introduced into the carbon dioxide stream simultaneously with the initial introduction of the liquified carbon dioxide into the formation for fracturing purposes.

Upon completion of fracturing, the well may be shut in to allow for complete vaporization of the carbon dioxide and to allow formation rebound about the proppants. The well is then opened on flow back and $CO_2$ gas is allowed to flow back and exhaust to the surface.

Particularly with respect to deep well applications, it may be desired to increase the viscosity and hence the competence of the liquid $CO_2$ to carry the proppants to greater depths. It has been found that using the present method of cooling and pressurizing the proppant particles, the addition of as little as 3% to 5% or up to 20% of a gelled carrier such as methanol will suffice to provide results comparable to those obtained from conventional techniques that require the addition of up to 70% gelled methanol or other suitable carriers. The use of as little as, for example, 5%, gell to achieve comparable results offers substantial and significant advantages over known techniques in terms of cost, safety and a virtually insignificant residual fluid recovery factor.

It has been found that the point of injection or addition of the gelled carrier is not critical and the gell may be added anywhere from the storage vessels 10 to the wellhead 40.

The invention is further illustrated by the following example.

EXAMPLE

A gas well located in Township 27 Range 18 west of the Fourth Meridian in Alberta, Canada was completed with 4½" casing cemented to a depth of 1,305 meters. Tubing 2⅞" in diameter was run in the well to a depth of 1,250 meters and a Glauconite formation was perforated from 1,257 meters to 1,265 meters. All completion fluid was removed from the well casing and tubing.

Dry, warm nitrogen gas was injected into the well annulus to pressure up the well and create the initial fracture so as to leave nitrogen gas in the tubing to casing annulus as a thermal insulation during the injection of liquid carbon dioxide. It will be understood that the injection of nitrogen gas forms no part of the present invention.

Six liquid carbon dioxide transports containing 96 m³ of liquid $CO_2$ at 200 psi and $-25°$ F. were connected to three high pressure frac pumpers through the high pressure proppant tank. 10,000 kilograms of 40/60 mesh silica sand proppant was placed in the proppant tank and the proppant tank was pressurized to 250 psig with liquid carbon dioxide. The carbon dioxide vaporized to cool the proppant to the temperature of the liquid carbon dioxide was vented from the top of the proppant tank. A volume equal to 59 cubic meters of liquid carbon dioxide containing 7,500 kilograms of 40/60 mesh silica sand proppant was injected into the formation down the tubing at a well head pressure of 25 to 30 MPa at rates of 1.6 to 2.4 cubic meters per minute. The well was shut in for one hour, then allowed to flow back on a ¼" choke. The well flowed back completely in a gaseous phase with an estimated 500 kilograms of silica sand proppant being produced in the first hour of flow. Production from the well was increased from 20 mcf/day at 100 psig before the treatment to 2.5 mm cf/day at 1050 psi after all of the injected carbon dioxide was recovered.

We claim:

1. A method of fracturing an underground stratigraphic formation penetrated by a well bore comprising the steps of:
   pumping a stream of liquified gas into said formation to cause the fracturing thereof;
   introducing proppants into said stream of liquified gas for injection of said proppants into said fractures; and
   pressurizing and cooling said proppants to substantially the storage pressure and temperature of said liquified gas prior to introducing said proppants into said stream of liquified gas.

2. The method of claim 1 including the step of adding a gelled carrier fluid to said stream of liquid gas such that said stream includes up to 20% by volume of gelled carrier fluid.

3. The method of claim 1 wherein said proppants are cooled using said liquified gas.

4. The method of claim 3 wherein the steps of pumping said stream of liquified gas and introducing said proppants into said stream are performed simultaneously.

5. The method of claim 4 wherein said liquified gas is carbon dioxide.

6. The method of claim 5 wherein said underground stratigraphic formation is a low permeability, hydrocarbon bearing horizon.

7. The method of claim 1 wherein said liquified gas is stored prior to pumping into the well bore at a temperature of approximately 0° F. to $-40°$ F. at a pressure of approximately 150 to 250 psi.

8. The method of claim 7 wherein the pressure of said liquified gas is increased to between 250 and 350 psi prior to the commencement of said pumping of said stream of liquified gas into the formation.

9. The method of claim 8 including the step of adding a gelled carrier fluid to said stream of liquified gas such that said stream includes up to 20% by volume of said gelled carrier fluid.

10. The method of claim 9 wherein said stream includes 5% to 10% by volume of said gelled carrier fluid.

11. The method of claim 2, 9 or 10 wherein said gelled carrier fluid is a gelled alcohol such as methanol.

12. The method of claim 1 wherein said pumping a stream of liquified gas comprises the step of injecting said stream of liquified gas into said formation at a pressure selected to cause the fracturing of said formation.

13. The method of claim 12 wherein said stream of liquified gas is injected into said formation by means of high pressure pumps, said proppants being introduced into said stream prior to said high pressure pumps.

14. A method of propping open an hydraulically fractured underground stratigraphic formation penetrated by a well bore comprising the steps of:
   introducing propping agents into a stream of pressurized liquified gas, said propping agents themselves being pressurized and cooled to the pressure and temperature of the liquified gas, respectively, prior to said introduction; and
   pumping the mixture of said liquified gas and entrained propping agents down said well bore into said formation to deposit said proppants in the fractures formed in said formation.

15. The method of claim 14 including the step of introducing a gelled carrier fluid into said stream of pressurized liquified gas to increase the viscosity thereof, said gelled carrier fluid being added to comprise up to 20% of the volume of said stream.

16. The method of claim 15 wherein said stream includes 5% to 10% by volume of said gelled carrier fluid.

17. The method of claim 16 wherein said liquified gas is carbon dioxide.

18. The method of claim 17 wherein said gelled carrier fluid is a gelled alcohol such as methanol.

19. Apparatus for hydraulically fracturing an underground stratigraphic formation penetrated by a well bore comprising:
   a high pressure pump for injecting a fracturing fluid down said well bore, said fluid comprising a liquified gas;
   first storage means to store said liquified gas under pressure;
   conduit means to provide fluid communication between said pump and said first storage means;
   second storage means to store proppants at a temperature and pressure substantially equal to the storage pressure and temperature of said liquified gas; and
   supply means to introduce the proppants from said second storage means into the liquified gas flowing through said conduit means.

20. The apparatus of claim 19 further including second conduit means to provide fluid communication between said first and second storage means whereby said liquified gas is used to cool and pressurize said proppants.

21. The apparatus of claim 20 wherein said first and second storage means comprise pressure vessels.

22. The apparatus of claim 21 wherein said supply means include an auger extending between said second storage means and said first conduit means so as to transport said proppants therebetween.

23. A method of treating an underground stratigraphic formation penetrated by a well bore comprising the steps of:
   injecting a stream of liquified gas into said formation;
   introducing proppants into said stream of liquified gas for injection of said proppants into said formation; and
   pressurizing and cooling said proppants to substantially the storage pressure and temperature of said liquified gas prior to introducing said proppants into said stream of liquified gas.

* * * * *